(No Model.)
J. BROWN.
BICYCLE WHEEL.
No. 602,552.
Patented Apr. 19, 1898.
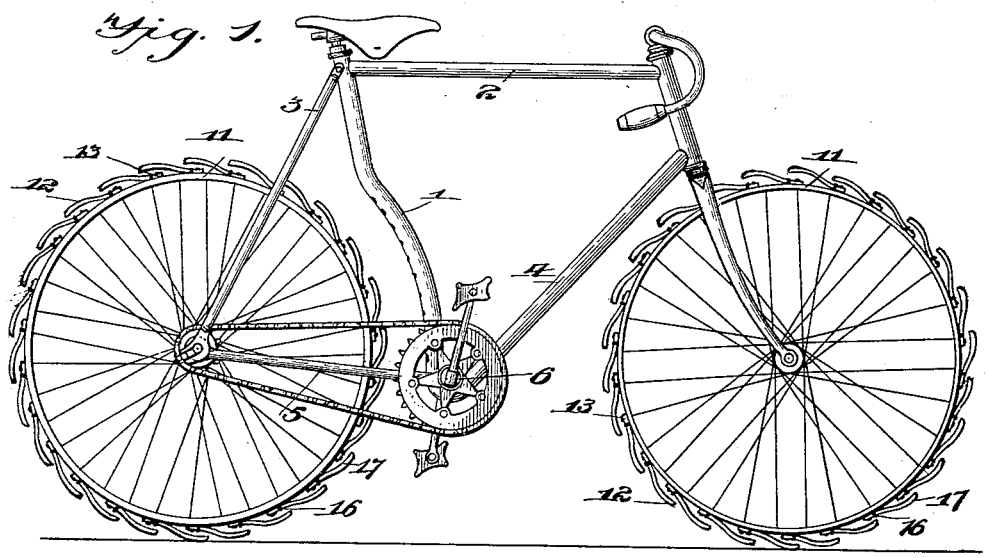
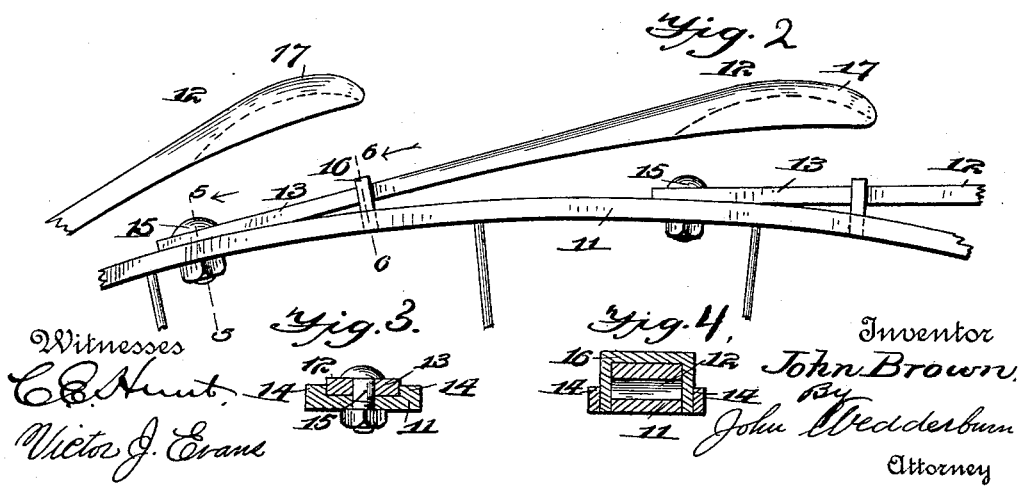

UNITED STATES PATENT OFFICE.

JOHN BROWN, OF PROVIDENCE, RHODE ISLAND.

BICYCLE-WHEEL.

SPECIFICATION forming part of Letters Patent No. 602,552, dated April 19, 1898.

Application filed August 27, 1897. Serial No. 649,750. (No model.)

*To all whom it may concern:*

Be it known that I, JOHN BROWN, of Providence, in the county of Providence and State of Rhode Island, have invented certain new and useful Improvements in Bicycles; and I do hereby declare the following to be a full, clear, and exact description of the invention, such as will enable others skilled in the art to which it appertains to make and use the same.

This invention has reference to a novel construction in bicycle-wheels, the object being to provide a novel construction in a wheel that affords a cushion, but without the use of confined air.

The invention consists in the features of construction hereinafter described and specifically claimed.

In the accompanying drawings, forming part of this specification, Figure 1 is an elevation showing a bicycle constructed in accordance with my invention. Fig. 2 is a fragmentary view of a portion of the wheel-rim constructed in accordance with this invention and taken on an enlarged scale. Figs. 3 and 4 are sections of the same, taken on the lines 5 5 and 6 6 of Fig. 2.

The invention can be applied to vehicles of all constructions; but for the purpose of illustrating the invention I have selected a bicycle, to which it is shown as applied, although it will be understood that the invention is not limited in any manner to the details of construction herein shown, excepting so far as they are specifically claimed.

Referring now to said drawings, 1 designates the seat-post tube, which is connected at its upper end to the upper bar 2 and inclined braces 3 and at its lower end to the bar 4, the bars 2 and 4 being connected to the steering-head in the usual manner. The axle of the main driving-wheel is journaled in bearings secured to the lower end of the inclined braces 3, and upon this axle are pivoted parallel bars 5 5, which are extended in front of the seat-post tube and rigidly secured to the crank-hanger 6. The crank-shaft is mounted within the crank-hanger upon the usual ball-bearings, and the said shaft is geared to the axle of the main driving-wheel by means of the usual sprocket wheel and chain connections.

Referring now to the construction of the wheel, 11 indicates the wheel-rim, and 12 a plurality of springs secured thereto. These springs are secured to the outer face of the rim and at one end only, with the other end projecting outwardly at a tangent to the rim, while the free ends of the springs overlap the other ends of the adjacent springs. These springs comprise a shank 13, that is adapted to be secured to the outer face of the rim and between outwardly-projecting lateral flanges 14 thereon. The shank of the spring fits between these flanges 14 and is securely held in place by means of a bolt 15 in the manner shown. A little distance away from the point where the spring is secured by the bolt a loop 16 is secured to the rim, between which and said rim the shank 13 passes. The outer end of the spring 12 is enlarged, as shown at 17, while the outer face of this enlarged portion is convex, and the inner face is concave in the manner shown. These springs are secured to the wheel in such a manner that their outer or free ends are in the rear when the wheel is rotated in driving the machine for obvious reasons. The said springs afford the desired flexibility and cushioning effect, it being noted that the loop 16 permits the springs to bend and unbend, and of course this cushioning effect is not dependent upon an air-cushion which can be punctured and made ineffective. It is to be noted also that this wheel can be used in connection with various vehicles—that is to say, this application is not confined to a bicycle.

Having thus described the invention, what I claim as new is—

1. A wheel for cycles, having a single rim, a plurality of springs secured upon the outer surface thereof, the outer end of each being free and unconfined and overlapping adjacent springs, and rigid loops surrounding said springs near their fixed ends, substantially as set forth.

2. A wheel comprising a rim provided with a plurality of springs secured thereto at one end, loops secured to said rim and through which said springs pass, and enlarged end portions upon said springs overlapping the other ends of the adjacent springs.

3. A wheel comprising a rim provided with outwardly-extending lateral flanges, a plurality of springs, each of said springs having a shank fitting between said flanges and secured at its end to the rim by means of a bolt, a loop secured to the rim through which the shank passes, while the outer end of the spring is enlarged and curved on its outer face and overlaps the inner end of the adjacent spring.

In testimony whereof I have signed this specification in the presence of the subscribing witnesses.

JOHN BROWN.

Witnesses:
CYRUS D. HARDY,
CHARLES STONE,
WM. H. GREENE.